US012687280B1

(12) United States Patent
Glazer et al.

(10) Patent No.: US 12,687,280 B1
(45) Date of Patent: Jul. 21, 2026

(54) LIGHT FIXTURE WITH TWIST RESISTANT MOUNT

(71) Applicant: Inter-Global, Inc., St. Louis, MO (US)

(72) Inventors: Larry J. Glazer, St. Louis, MO (US); Wendell S. Dodson, St. Louis, MO (US)

(73) Assignee: Inter-Global, Inc., St. Louis, MO (US)

( * ) Notice: Subject to any disclaimer, the term of this patent is extended or adjusted under 35 U.S.C. 154(b) by 169 days.

(21) Appl. No.: 18/823,884

(22) Filed: Sep. 4, 2024

(51) Int. Cl.
*F21V 21/02* (2006.01)
*F21V 23/00* (2015.01)

(52) U.S. Cl.
CPC ............ *F21V 21/02* (2013.01); *F21V 23/002* (2013.01)

(58) Field of Classification Search
CPC .......... F21V 21/02; F21V 15/01; F21V 17/12; F21V 23/009; F21V 21/088; F21V 23/06; F21V 17/18; F21V 17/16; F21V 21/108; F21V 23/002; F21V 3/00
See application file for complete search history.

(56) References Cited

U.S. PATENT DOCUMENTS 1,767,585 A * 6/1930 Hebendahl .............. F21V 37/00 248/219.3
11,536,420 B1 12/2022 Glazer et al.
11,708,963 B1 7/2023 Glazer et al.
12,338,975 B1 * 6/2025 Zhang ...................... F21S 9/02

* cited by examiner

*Primary Examiner* — William J Carter
(74) *Attorney, Agent, or Firm* — Carmody MacDonald P.C.; Dennis Jm Donahue, III; Kevin C. Staed

(57) ABSTRACT

A light fixture has a base that is connected to a housing through a wireway at its upper portion and a pair of offsets at its lower portion, and a stabilizer block that is located between the pair of offsets extends from the base to a recess in the housing's lower portion with a friction fit connection. The housing's lower portion has a thickened sidewall in which the recess is formed. The thickened sidewall also includes a pair of cavities with apertures where the offsets are fastened to the base. The stabilizer block and the wireway are aligned with each other in a longitudinal axis, and the stabilizer block and the offsets are aligned with each other along a lateral axis that is perpendicular to the lateral axis. The wireway is harder than the housing, and its threaded end engages the threaded aperture in the housing's upper portion.

20 Claims, 4 Drawing Sheets

LIGHT FIXTURE WITH TWIST RESISTANT MOUNT

CROSS-REFERENCE TO RELATED APPLICATIONS

This application is an original US Non-Provisional Patent Application and makes no claim to an earlier filing date.

STATEMENT REGARDING FEDERALLY SPONSORED RESEARCH

Not Applicable.

APPENDIX

Not Applicable.

BACKGROUND OF THE INVENTION

Field of the Invention

The present invention relates to the field of light fixtures, and more particularly to wall mounted sconces in which the housing for the light fixture is spaced apart from the base.

Related Art

Wall sconce type light fixtures have long been used on the interior and exterior of buildings, homes and other structures as décor and to illuminate surrounding areas. Generally, these wall-mounted light fixtures include a base section that is attached to the supporting structure with common fasteners and a shade attached to the base section. The wiring used to power the light fixture are routed from the electrical system of the structure, through the base section and to lighting assembly supported within the shade, such as a socket assembly or LED assembly. Subsequently, light is emitted from the light fixture with the shade directing the light emanating from the bulb during use. In one type of sconce light fixture, the housing for the light fixture is flush against the base section, such as shown and described in U.S. Pat. No. 11,708,963. In another type of sconce light fixture, the housing for the light fixture is spaced apart from the base section and is connected to the base section by one or more couplings, such as shown and described in U.S. Pat. No. 11,536,420 which is incorporated by reference herein.

As indicated in the '963 Patent and the '420 Patent, the housings for the light include watertight seals which protect the lighting assembly from potentially harmful environmental conditions, such as rain when the sconce is used on the exterior of a structure. When the housing is spaced from the base, other environmental conditions have the potential to cause damage to light fixtures, such as wind which can cause the housing to twist relative to its connection points with the base. It would be beneficial to improve the ability of spaced housings to be more resistant to twisting that can be caused by wind.

SUMMARY OF THE INVENTION

The invention described herein is a light fixture in which the housing is connected to the base through a wireway at its upper portion and a pair of offsets at its lower portion, and a stabilizer that is located between the pair of offsets extends from the base to a recess in the lower portion of the housing with a friction fit connection.

In one aspect of the invention the housing's lower portion has a thickened sidewall in which the recess is formed and which also includes a pair of cavities with apertures where the offsets are fastened to the base with a pair of screws.

In another aspect of the invention, the stabilizer and the wireway are aligned with each other in a longitudinal axis, and the stabilizer and the offsets are aligned with each other along a lateral axis that is perpendicular to the lateral axis.

In yet another aspect of the invention, the wireway is harder than the housing, and its one threaded end engages a threaded aperture in the housing's upper portion, and its opposite end is threaded on a pair of arc sections with a pair of flat sections therebetween. This end with the arcs and flat sections extend through a similarly shaped aperture in the base and a nut screws onto the threaded arcs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
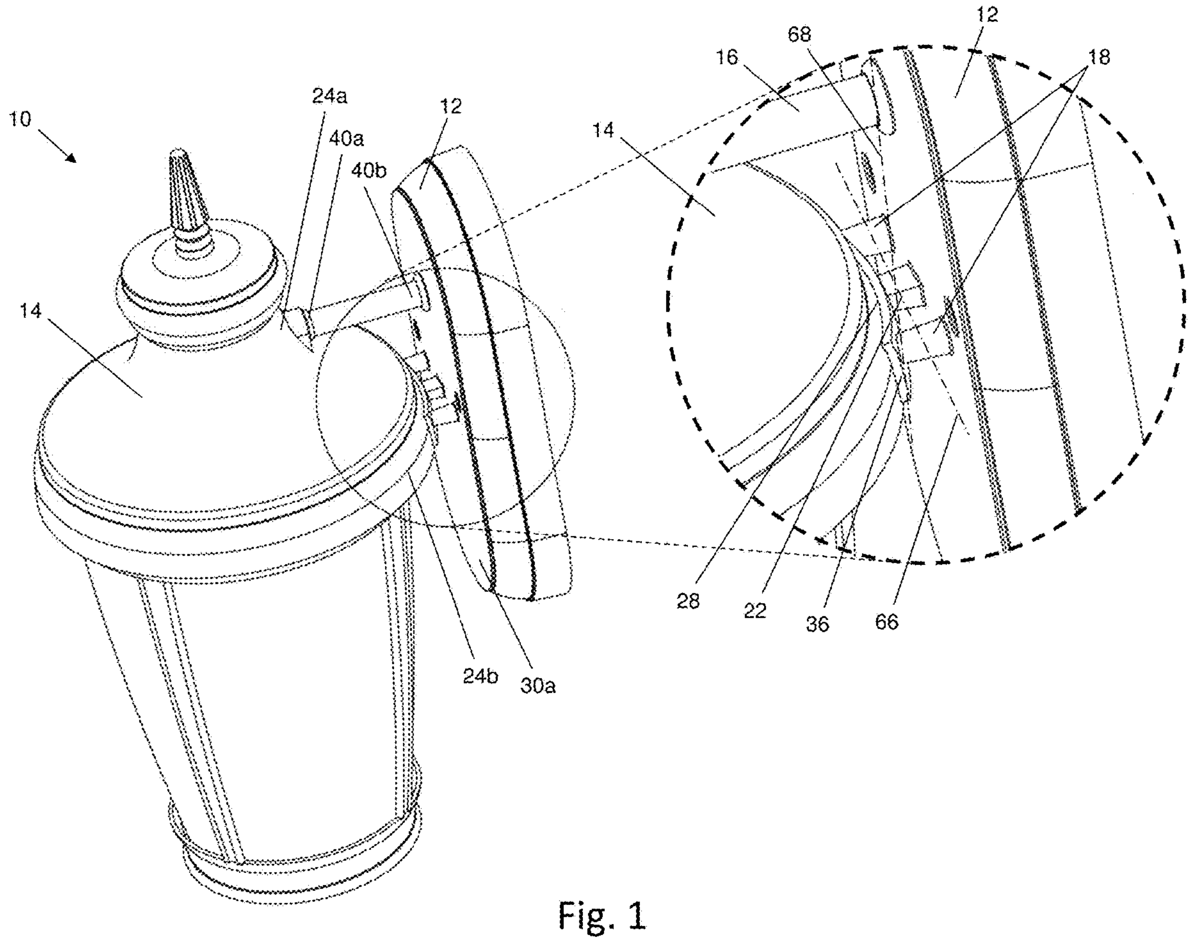
FIG. 1 is a perspective view of a light fixture according to the present invention with a detail image of the connection points between the housing and the base.
Figure 2:
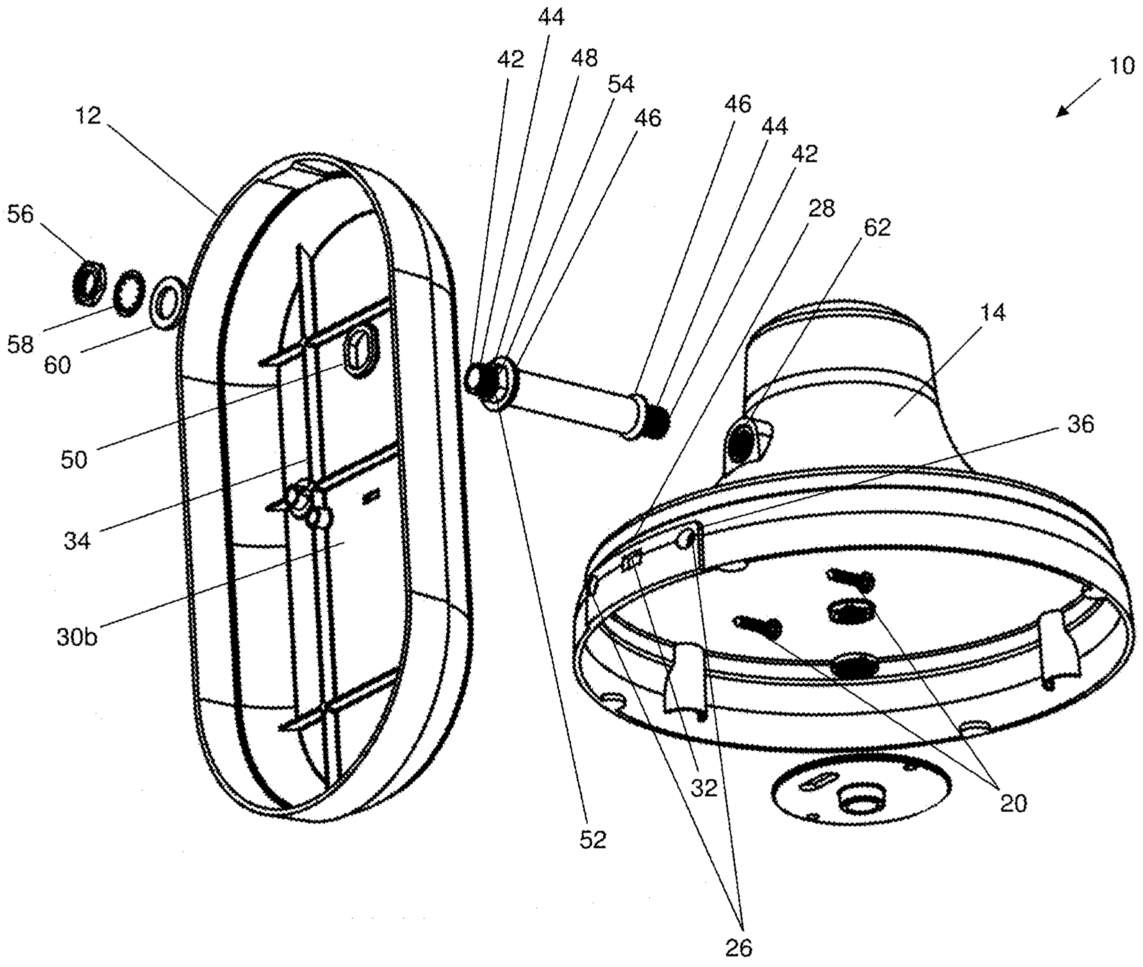
FIG. 2 is a partial exploded view of the light fixture shown in FIG. 1.
Figure 3A:
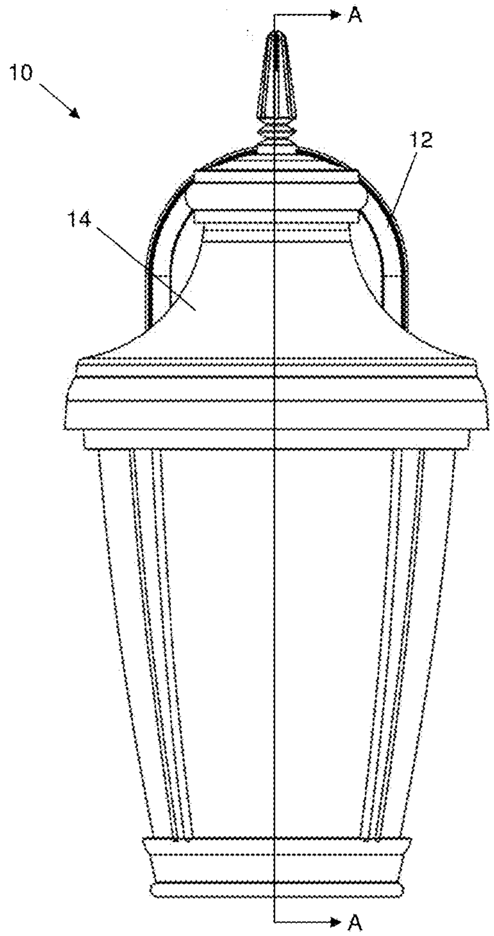
FIG. 3A is a front view of the light fixture shown in FIG. 1.
Figure 3B:
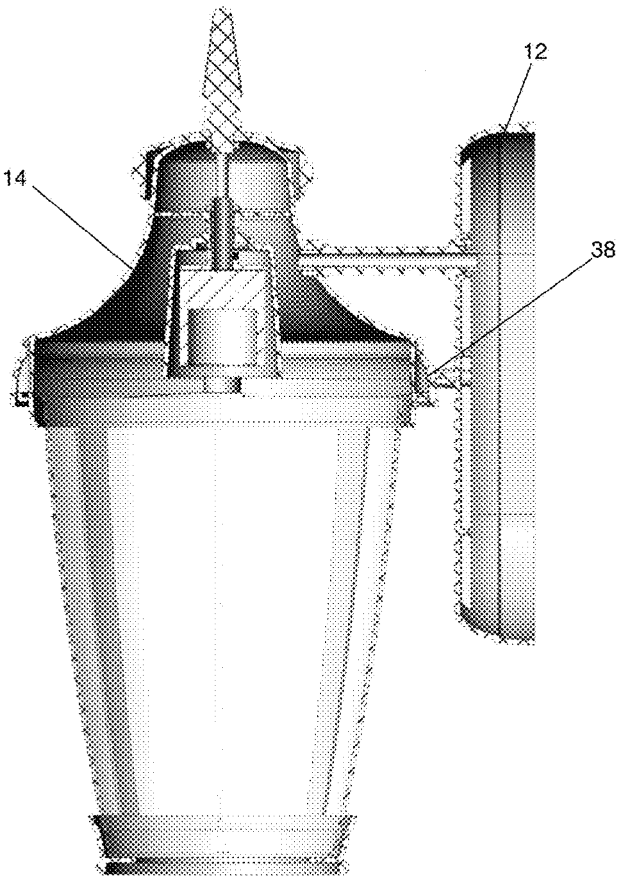
FIG. 3B is a cross-sectional view taken through section A-A in FIG. 2A.
Figure 3C:
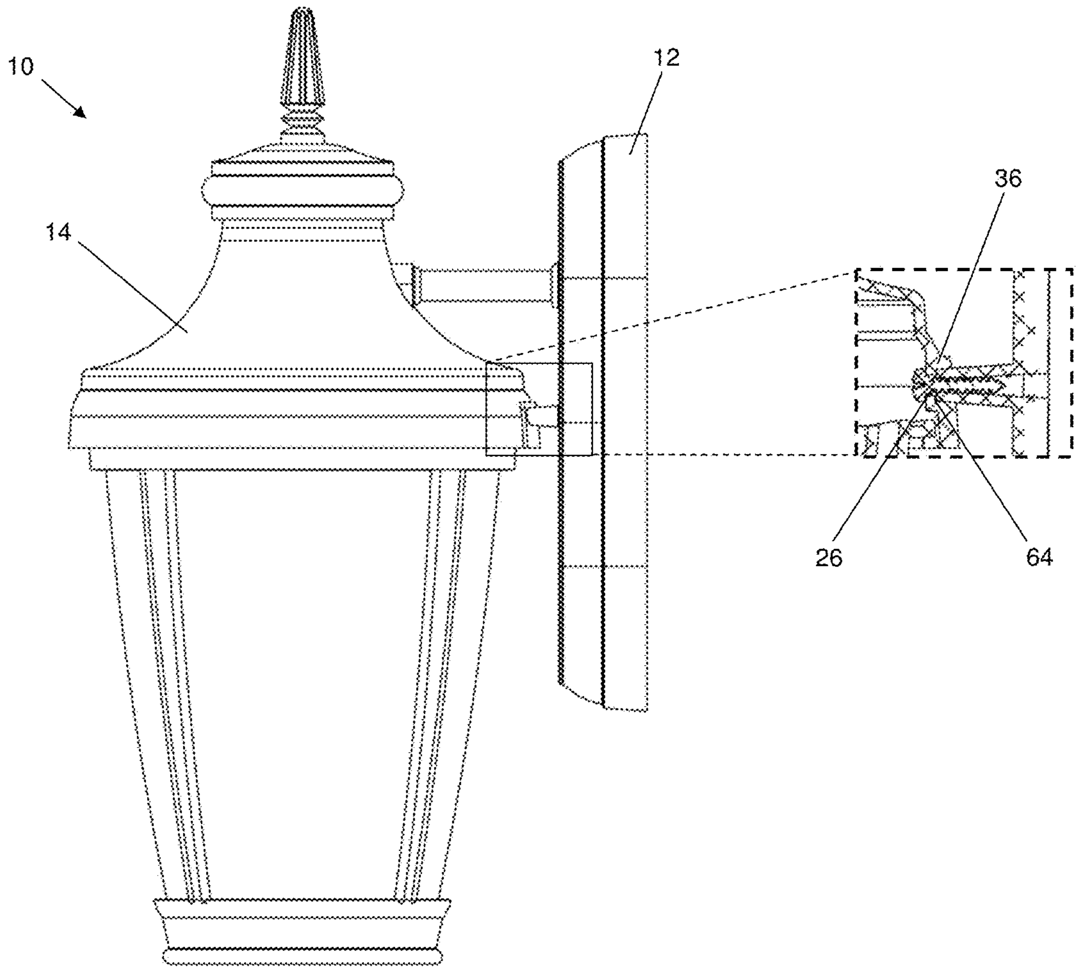
FIG. 3C is a side view of the light fixture shown in FIG. 1 with a detail cross-sectional image of the fastened connection.

The following description of the preferred embodiment(s) is merely exemplary in nature and is in no way intended to limit the invention, its application, or uses.

The light fixture 10 of the present invention has a base 12, a housing 14, a wireway 16, a pair of offsets 18 with a corresponding pair of screws or other fasteners 20, and a stabilizer block 22. The housing has an upper portion 24*a* and a lower portion 24*b*, and the wireway connects the upper portion of the housing to the base. The housing's lower portion has a pair of apertures 26 in a periphery section 28 which face the base's front side 30*a*, the periphery section also includes a recess 32 between the pair of apertures. The back side 30*b* of the base preferably includes a frame 34 to provide additional stiffness to the base structure, and the housing's lower portion preferably includes a thickened sidewall 36 around the recess and the pair of apertures in the periphery section. The screws extend through the apertures and connect the pair of offsets to the lower portion of the housing, and the stabilizer block's distal end 38 preferably fits in the recess with a friction fit connection. The pair of apertures in the periphery are preferably recessed in a pair of cavities 64 in the thickened sidewall, and the pair of offsets extend into the respective pair of cavities.

The wireway's housing end 40*a* and base end 40*b* both preferably have a threaded distal end 42 with a threaded surface 44 and a flange 46. The wireway's base end preferably has a spline 48 between the flange and the threaded distal end. The wireway's threaded distal end of extends through a key aperture 50 in the base with sidewalls that mate with the wireway's spline. The spline can be formed with any shape that mates with the key aperture, and in the particular embodiment of the present invention, the spline shape is a pair of circular arc sections 52 and a pair of flat sections 54 that extend between the circular arc sections. A nut 56 and locking washer 58 screw onto the threaded distal end at the back side of the base, and the flange abuts the front side of the base. Preferably a bushing 60 is positioned between the locking washer and the key aperture to provide a watertight seal between the waterway and the base. A threaded aperture 62 is formed in the upper portion of the housing where the housing end is connected. Preferably, the threads are molded with the aperture.

The base and the wireway are preferably formed from a harder material than the fixture's housing. For example, the base and the wireway can be a polycarbonate (PC) material while the housing can be a polypropylene (PP) material. This allows for the threaded distal end of the wireway's housing end to engage the threads in the sidewalls of the housing's threaded aperture as it is screwed in and thereby make a water-tight seal even when its flange isn't seated flush against the exterior sidewall of the housing. As indicated above, the threads are preferably molded with the aperture rather than forming a smooth bore and then tapping it to form the threads. It is also possible for the wireway to be formed with a self-tapping type-F thread that cuts threads into the smooth bore of the aperture. Regardless of how the threads are formed in the threaded aperture in the upper section of the housing, the threaded distal end of the wireway's housing end engage with the threads and form a water-tight seal. The flange around the wireway's housing end does not need to be seated flush against the housing to form a water-tight seal, and it can be backed away from the housing by a half-turn to allow the wireway's spline at the base end to be aligned with and fit into the key aperture in the base.

Preferably, the stabilizer and the wireway are aligned with each other in a longitudinal axis 66, and the stabilizer and the pair of offsets are aligned with each other along a lateral axis 68 that is perpendicular to the longitudinal axis. The pair of offsets preferably have a tubular shape, and the stabilizer and the pair of offsets can be integrally formed with the base. The horizontally arranged standoffs with the wireway spaced vertically above the stabilizer block at the midpoint between the standoffs results in a secure mounting for the light fixture which supports the housing and also stabilizes the housing from sideways forces and twisting that can be generated by wind gusts.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A light fixture, comprising:

a base comprising a front side and a back side;

a housing, wherein the housing has an upper portion and a lower portion, wherein the lower portion comprises a pair of apertures in a periphery section facing the front side of the base and a recess in the periphery section between the pair of apertures;

a wireway connecting the upper portion of the housing to the base;

a pair of offsets extending from the front side of the base to the respective pair of apertures in the lower portion of the housing, wherein the pair of offsets maintain an open space between the front side of the base and the lower portion of the housing;

a pair of fasteners respectively extending through the pair of apertures and connecting the pair of offsets to the lower portion of the housing; and a stabilizer block positioned between the pair of offsets and extending from the base to the lower portion of the housing, wherein a distal end of the stabilizer block fits within the recess.

2. The light fixture of claim 1, wherein the distal end of the stabilizer block has a friction fit with the recess.

3. The light fixture of claim 1, wherein the lower portion of the housing is comprised of a thickened sidewall surrounding the recess.

4. The light fixture of claim 3, wherein the thickened sidewall extends in the periphery section to surround the pair of apertures.

5. The light fixture of claim 4, wherein the pair of apertures are recessed in a pair of cavities in the thickened sidewall, and wherein the pair of offsets extend into the respective pair of cavities.

6. The light fixture of claim 1, wherein the stabilizer block and the wireway are aligned with each other in a longitudinal axis, and wherein the stabilizer block and the pair of offsets are aligned with each other along a lateral axis perpendicular to the longitudinal axis.

7. The light fixture of claim 1, wherein a housing end and a base end of the wireway are each comprised of a threaded distal end, wherein the base end of the wireway is further comprised of a flange and a spline between the flange and the threaded distal end, wherein the threaded distal end of the wireway's base end extends through a key aperture in the base with sidewalls that mate with the spline of the wireway, wherein a nut screws onto the threaded distal end at the back side of the base, and wherein the flange abuts the front side of the base.

8. The light fixture of claim 7, wherein the spline is comprised of pair of circular arc sections and a pair of flat sections extending between the pair of circular arc sections, wherein the upper portion of the housing is comprised of a threaded aperture, wherein the wireway is comprised of a harder material than the housing, and wherein the threaded distal end of the housing end of the wireway engages the threaded aperture as it is screwed into the housing.

9. The light fixture of claim 1, wherein the stabilizer block and the pair of offsets are integrally formed with the base, wherein the pair of offsets are tubular, and wherein the pair of fasteners connecting to the pair of offsets are a pair of screws.

10. The light fixture of claim 9, wherein the stabilizer block has a trapezoidal prism shape.

11. A light fixture, comprising:

a base comprising a front side and a back side;

a housing, wherein the housing has an upper portion and a lower portion, wherein the lower portion comprises a pair of apertures in a periphery section facing the front side of the base and a recess in the periphery section between the pair of apertures;

a wireway connecting the upper portion of the housing to the base;

a pair of offsets extending from the front side of the base to the respective pair of apertures in the lower portion of the housing;

a pair of fasteners respectively extending through the pair of apertures and attaching the pair of offsets to the lower portion of the housing; and a stabilizer block positioned between the pair of offsets and extending from the base to the lower portion of the housing, wherein a distal end of the stabilizer block has a friction fit within the recess and does not extend through the periphery section.

12. The light fixture of claim 11, wherein the lower portion of the housing is comprised of a thickened sidewall in the periphery section surrounding the recess and the pair of apertures, wherein the pair of apertures are recessed in a pair of cavities in the thickened sidewall cross-section, and wherein the pair of offsets extend into the respective pair of cavities.

13. The light fixture of claim 11, wherein the stabilizer block and the wireway are aligned with each other in a longitudinal axis, and wherein the stabilizer block and the pair of offsets are aligned with each other along a lateral axis perpendicular to the longitudinal axis.

14. The light fixture of claim 11, wherein a housing end and a base end of the wireway are each comprised of a threaded distal end, wherein the base end of the wireway is further comprised of a flange and a spline between the flange and the threaded distal end, wherein the threaded distal end of the wireway's base end extends through a key aperture in the base with sidewalls that mate with the spline of the wireway, wherein a nut screws onto the threaded distal end at the back side of the base, and wherein the flange abuts the front side of the base.

15. The light fixture of claim 11, wherein the pair of offsets maintain an open space between the front side of the base and the lower portion of the housing.

16. The light fixture of claim 11, wherein the pair of offsets are tubular, and wherein the pair of fasteners connecting to the pair of offsets are a pair of screws, and wherein the stabilizer block has a trapezoidal prism shape.

17. A light fixture, comprising:

a base comprising a front side and a back side;

a housing, wherein the housing has an upper portion and a lower portion, wherein the lower portion comprises a pair of apertures in a periphery section facing the front side of the base and a recess in the periphery section between the pair of apertures;

a wireway connecting the upper portion of the housing to the base;

a pair of offsets integrally formed with the base and extending from the front side of the base to the respective pair of apertures in the lower portion of the housing, wherein the pair of offsets are tubular;

a pair of screws respectively extending through the pair of apertures and attaching the pair of offsets to the lower portion of the housing; and a stabilizer block positioned between the pair of offsets and extending from the base to the lower portion of the housing, wherein the stabilizer block has a trapezoidal prism shape, and wherein a distal end of the stabilizer block has a friction fit within the recess.

18. The light fixture of claim 17, wherein the lower portion of the housing is comprised of a thickened sidewall in the periphery section surrounding the recess and the pair of apertures, wherein the pair of apertures are recessed in a pair of cavities in the thickened sidewall cross-section, and wherein the pair of offsets extend into the respective pair of cavities.

19. The light fixture of claim 17, wherein the stabilizer block and the wireway are aligned with each other in a longitudinal axis, and wherein the stabilizer block and the pair of offsets are aligned with each other along a lateral axis perpendicular to the longitudinal axis.

20. The light fixture of claim 17, wherein a housing end and a base end of the wireway are each comprised of a threaded distal end, wherein the base end of the wireway is further comprised of a flange and a spline between the flange and the threaded distal end, wherein the threaded distal end of the wireway's base end extends through a key aperture in the base with sidewalls that mate with the spline of the wireway, wherein a nut screws onto the threaded distal end at the back side of the base, and wherein the flange abuts the front side of the base.

* * * * *